United States Patent
Shew et al.

(10) Patent No.: US 7,443,831 B2
(45) Date of Patent: Oct. 28, 2008

(54) CALL CONTROL USING A LAYERED CALL MODEL

(75) Inventors: Stephen Shew, Kanata (CA); Malcolm Betts, Kanata (CA); Nigel Davis, Edgware (GB); Erning Ye, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 933 days.

(21) Appl. No.: 10/678,780

(22) Filed: Oct. 3, 2003

(65) Prior Publication Data

US 2005/0074029 A1    Apr. 7, 2005

(51) Int. Cl.
*H04L 12/28* (2006.01)
(52) U.S. Cl. ...................................... 370/351; 370/401
(58) Field of Classification Search .................. 370/401, 370/397, 351, 469
See application file for complete search history.

(56) References Cited

U.S. PATENT DOCUMENTS

| | | | |
|---|---|---|---|
| 5,010,550 A | 4/1991 | Hirata | |
| 5,617,413 A | 4/1997 | Monacos | |
| 6,189,025 B1* | 2/2001 | Ogura et al. | 709/203 |
| 6,298,059 B1* | 10/2001 | St-Amand et al. | 370/397 |
| 6,526,063 B1 | 2/2003 | St-Amand et al. | |
| 6,564,258 B1* | 5/2003 | Uniacke | 709/223 |
| 6,747,986 B1* | 6/2004 | Charas et al. | 370/465 |
| 6,785,264 B1* | 8/2004 | Borden et al. | 370/352 |
| 6,920,503 B1* | 7/2005 | Nanji et al. | 709/230 |
| 7,068,594 B1* | 6/2006 | Tasker | 370/217 |
| 2003/0101372 A1* | 5/2003 | Bouat et al. | 714/13 |

* cited by examiner

*Primary Examiner*—Chi H. Pham
*Assistant Examiner*—Mon Cheri S Davenport
(74) *Attorney, Agent, or Firm*—Pearne & Gordon LLP

(57) ABSTRACT

An aspect of the present invention provides a method of controlling a multi-layer transport network. In accordance with the invention a determination is made as to whether a connection supporting a performance requirement of a call can be established within a first layer of the network. If the connection cannot be established, an association is defined between the call and a second call instantiated within a respective server layer of the network. By this means a network call controller in a client layer relies on a call and connection in a server layer instead of a connection in the client layer.

14 Claims, 3 Drawing Sheets

CALL CONTROL USING A LAYERED CALL MODEL

CROSS-REFERENCE TO RELATED APPLICATIONS

This is the first application filed for the present invention.

MICROFICHE APPENDIX

Not Applicable.

TECHNICAL FIELD

The present invention relates to call control in a transport network, and in particular to call control using a layered call model.

BACKGROUND OF THE INVENTION

The modern transport network space is characterised by a large number of heterogenous networks which are interconnected by gateway servers. Each network may implement any one or more of a variety of transport protocols (e.g. Ethernet, ATM, TCP/IP; SONET/SDH). Where interconnected networks employ different transport protocols, adaptation services provided by the gateway servers facilitate transport of client data between the involved networks. In response to the demand for seamless communications across this "network of networks", much effort has been made to develop generic connection management schemes that can be utilized by network service providers independently of the transport technology used. This work has resulted in the International Telecommunications Union (ITU) standard Recommendation G.805, which defines a layered functional architecture for transport networks. Based on the G.805 layer architecture two models have been developed: G.8080 for the control plane (Automatically Switched Optical Network—ASON); and Tele-Management Forum (TMF) model TMF608 for the management plane. TMF814 is an interface specification of TMF that instantiates the TMF608 model. G.8080 defines two types of call controllers: calling/called party call controllers (CCCs); and network call controllers (NCCs). Calling/called party call controllers initiate and terminate calls, whereas network call controllers interact with the CCCs and with connection controllers to manage connections within the network. Within the management plane, TMF814 provides an interface that uses the G.805 model of connections. The relationship between connections at different layers is known in the TMF814 interface. Thus it can be used to manage multi-layer connections across the network.

G.8080 uses the existing definition of a logical separation between calls and connections. A "call" may be understood as an "agreement" or an "intent" to communicate. Typically, the call will be represented by a call object which contains metadata concerning the call. Such metadata may, for example, include billing information; characteristic information (CI) of the call (e.g., transport protocol, bit rate, etc.); security parameters; and quality of service (QoS) requirements. While a call represents an agreement to communicate, a "connection" provides the actual means for communication. Thus, for example, instantiation of a call object indicates a client's intent to communicate, and provides the information required by network service providers to facilitate and manage the communications. On the basis of the call object, the network service provider(s) can then provide (usually through signalling protocols) the physical network resources (that is, the connections) required to transport the client traffic.

FIG. 1 illustrates a possible scenario in which it is desired to transport Ethernet frames (MAC frames) between an originating client 2 and a destination client 4 using the conventional G.805 architecture. In the example of FIG. 1, the two clients are located in separate networks, so that it is not possible to transport MAC frames "directly" between the two nodes. Instead, an originating Client Call Controller (CCC) 6 resident in the "originating" client 2 establishes a MAC call segment 8 and an associated connection 10 with a corresponding MAC Network Call Controller ($NCC_{MAC}$) 12 in an ingress Network Element (NE-1) 14 of a broadband (in this case, a SONET/SDH) network 16. This MAC call/connection enables MAC frames to be transported between the originating client 2 and the ingress Network Element (NE-1) 14. The ingress $NCC_{MAC}$ 12 then sets up a second MAC call segment 18 with an associated $NCC_{MAC}$ 20 in an egress Network Element (NE-2) 22 of the broadband network 16. However, because the broadband network 16 cannot transport MAC frames, an associated MAC connection cannot be established between the ingress and egress NEs 14 and 22. However, a VC-3 connection can be established, and, with appropriate adaptation, can support the bandwidth requirements of the flow of MAC frames. Accordingly, the network service provider establishes a VC-3 call segment 24 and an associated VC-3 connection 26 between VC-3 network call controllers ($NCC_{VC-3}$) 28 and 30 in the ingress and egress NEs 14, 22. Adaptation services 32 are then provided in the ingress and egress network element 14, 22, so that a MAC connection can be "presented" to the ingress and egress $NCC_{MAC}$s 12, 20 and thereby facilitate transport of MAC frames across the broadband network 16. Finally, the $NCC_{MAC}$ 20 in the egress network element 22 establishes a MAC call segment 34 and an associated MAC connection 36 with a corresponding Client Call Controller 38 in the destination client node 4.

In the example of FIG. 1, the lack of transport network resources capable of supporting a MAC connection between the ingress and egress NEs 14, 22 is overcome by providing a VC-3 connection 26 and adaptation services 32 to effectively emulate the required MAC connection. ITU standard G.805 enables this connection emulation scheme to be applied recursively across virtually any number of network layers. By this means, traffic flows across virtually any arbitrary mixture of heterogenous networks can be supported. A further advantage of ITU standard G.805 is that the recursive layering scheme can be extended to include new transport protocols and technologies as they become available.

However, a limitation of G.8080 (that is, the Automatically Switched Optical Network—ASON) is that it is defined for a single-layered control plane. Thus, in the example of FIG. 1, overall control of communications between the originating and destination client nodes is provided by MAC call segments between each of the involved MAC Call Controllers. Between each CCC and its respective $NCC_{MAC}$, the MAC call segments 8, 34 are associated with MAC connections 10 and 36, and thus also have awareness and control of those MAC connections. However, between the ingress and egress Network elements 14 and 22, the required MAC connection is emulated using a VC-3 call/connection 24, 26. The "parallel" MAC call segment 18 between the NCCs 12, 20 "sees" a MAC connection, and has no awareness of either the underlying VC-3 call 24 or its associated VC-3 connection 26. The VC-3 call 24, on the other hand, "sees" an STS traffic flow, and has no awareness that it is actually transporting encapsulated MAC frames. This situation creates a number of difficulties.

In particular, when an NCC determines that there are no (or insufficient) resources in its own layer, it responds by merely indicating that the connection attempt has failed. It cannot automatically determine whether or not adequate resources exist in another layer. Even if such server-layer resources are present, the NCC has no means of instantiating the required connection or the necessary adaptation services. This situation is usually remedied by manual configuration of server layer trails that are then used by client connections. It is an operational procedure to the network operator. Thus, following the above example, the VC-3 call segment 24 and connection 26 must be manually provisioned by the network service provider, and presented to each $NCC_{MAC}$ 12 and 20 as a MAC trail. Once this has been done, the MAC call segment 18 can direct a connection controller to instantiate a MAC connection for it. This requirement for manual provisioning of server-layer connections effectively precludes automated instantiation of connections across heterogenous networks. Furthermore, network service providers in each network require a very high level of understanding of subscriber traffic requirements in order to properly provision network resources. Furthermore, a network failure in a server layer cannot be readily correlated with client-layer calls, because the server-layer call has no awareness of the client-layer calls that it is actually supporting.

An efficient technique for overcoming these limitations is highly desirable.

SUMMARY OF THE INVENTION

Accordingly, an object of the present invention is to provide a layered call model that enables a call segment in a client layer to be aware of associated calls/connections in a server layer.

An aspect of the present invention provides a method of controlling a multi-layer transport network. In accordance with the invention a determination is made as to whether a connection supporting a performance requirement of a call can be established within a first layer of the network. If the connection cannot be established, an association is defined between the call and a second call instantiated within a respective server layer of the network.

A further aspect of the present invention provides a method of establishing a call across a multi-layer transport network. A first call controller is instantiated within a respective first layer of the network. A determination is made as to whether a respective connection for the call can be supported by the first layer. If the connection can be supported by the first layer, the call is set up through the first layer of the network. Otherwise, a second call controller is instantiated in a respective server layer to the first layer, and an association defined between the first and second call controllers.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1A:
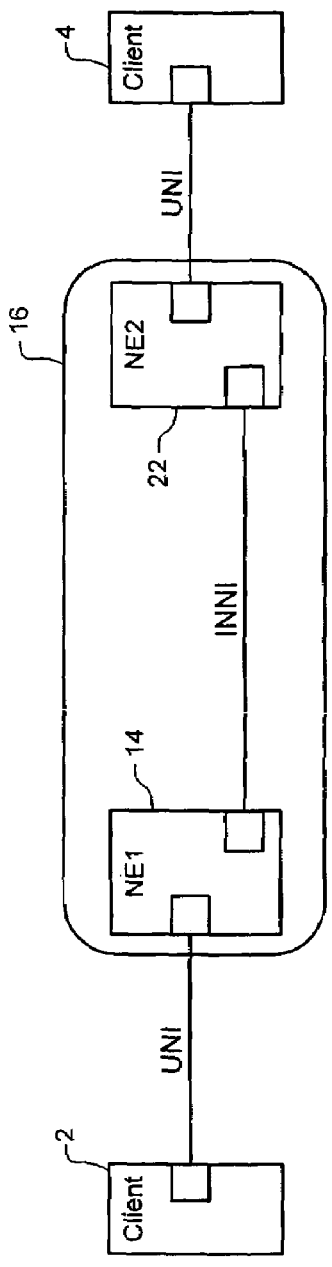
FIGS. 1*a* and 1*b* schematically illustrate equipment and control plane views, respectively, of a connection mapped across a multi-layer transport network, using the conventional G.8080 architecture.

The present invention provides a generic layered call model that enables a call segment in a one layer to be associated with calls in other layers. In one view, the present invention extends the ITU standard G.8080 to enable multi-layer call associations that mirror the TMF814 connection model. Another view of the present invention is that it extends TMF608 and TMF814 to support layer relationships between calls.

In order to simplify the following description, the present invention will be described below with reference to an example in which a singal call in a client layer is supported by a single server layer call. However, those of ordinary skill in the art will appreciate that the present invention also encompasses embodiments in which a client layer call is supported by two or more server-layer calls, some of which may, or may not, be themselves supported by calls on still lower layers of the network. Similarly, a server layer call may support two or more client layer calls, some of which may, or may not, be themselves supporting client layer calls on still higher layers of the network.

In accordance with the present invention, upon instantiation of a call (or call segment), the involved G.8080 call controller (either an NCC or a CCC) determines whether or not the characteristic information (CI) of the call can be supported by a connection at that layer. If the CI cannot be supported at that layer, the call controller formulates and sends a request to a server layer call controller, so as to thereby trigger instantiation of one or more calls within the server layer. This process can be repeated, recursively, across multiple network layers in a manner directly analogous to the TMF608 and TMF814 connection model.

Implementation of the present invention involves extending the ITU standard G.8080 call controllers to control both connection instantiation in the client layer and call initiation in a server layer, and implementing the corresponding functionality in the TMF814 object that holds the call. A G.8080 call controller is typically designed interact with a connection controller (CC) object in its own layer to instantiate a connection. In the present invention, an enhanced call controller is defined, in which the conventional functionality is extended such that, if the connection cannot be instantiated within that layer, the enhanced call controller can formulate and send a "call request" message to an enhanced server layer call controller. The call request message includes suitable parameters to enable the server layer call controller to meet the service level requirements defined in the CI of the (client layer) call. These parameters do not need to be identical to the client layer parameters, as the server layer may choose to satisfy the call request with a more stringent service. In addition to instantiating a call, the enhanced server-layer call controller can also repeat the process of determining whether sufficient resources exist at that layer, and, if necessary, request one or more calls at a still lower layer of the network.

In order to support the extended functionality of enhanced call controllers, the connection controller (CC) remains unchanged in that the CC object will attempt to instantiate a connection only in response to a connection request from a call controller at that layer. In the event that the performance requirements of the call cannot be met within that layer, the CC will return a "connection failed" and/or "insufficient resource" indication to the call controller. With this arrangement, the enhanced call controller can be designed to formulate and send the call request message in response to the "Connection Failed" indication from the CC object.

Because the instantiation of server-layer calls (and connections) is triggered by a call request from a client layer enhanced call controller, an association between the client and server-layer call controllers is created. This association, which serves as a substitute for the "missing" client layer connection, means that the client and server layer call controllers are aware of each other. They can therefore cooperate to automatically use appropriate adaptation services, as required. They can also pass status and call control information between layers. Thus, for example, connection failures in a server layer can readily be co-related with client layer call failures.

Figure 1B:
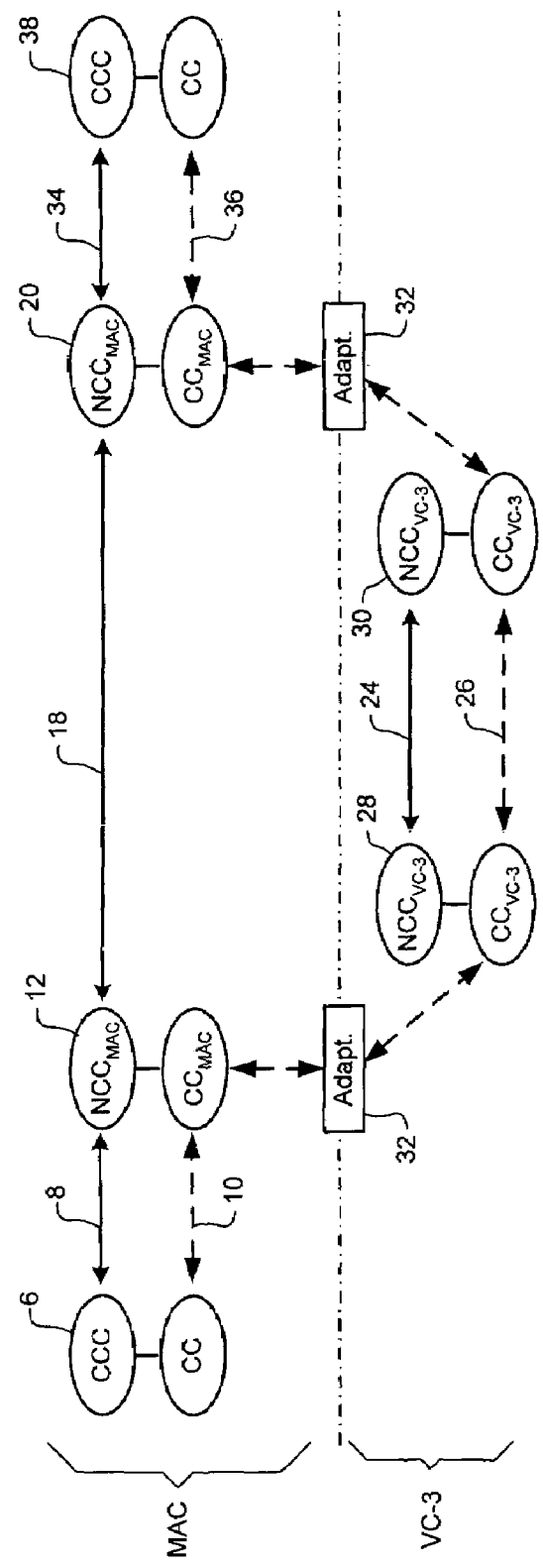
Figure 2A:
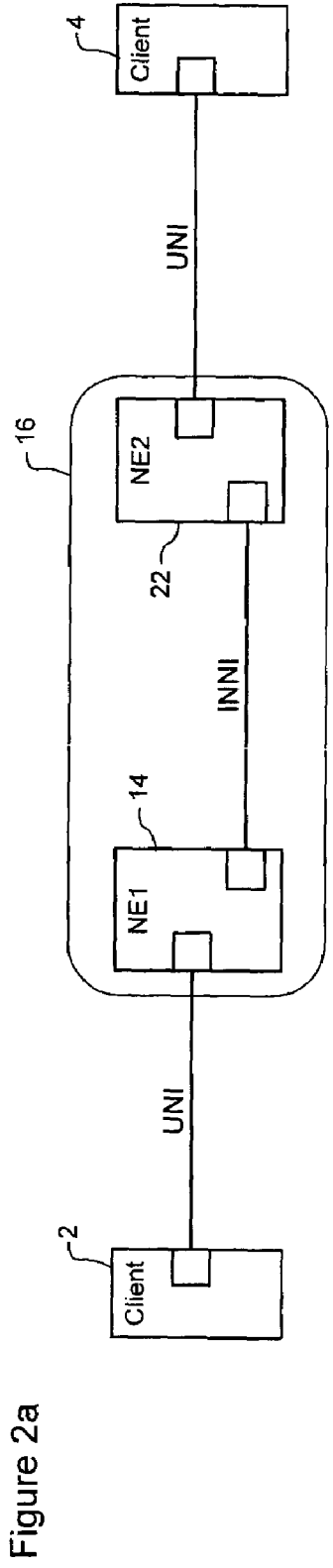
FIGS. 2*a* and 2*b* schematically illustrate equipment and control plane views, respectively, of connection mapped across a multi-layer transport network, in accordance with the present invention.
Figure 2B:
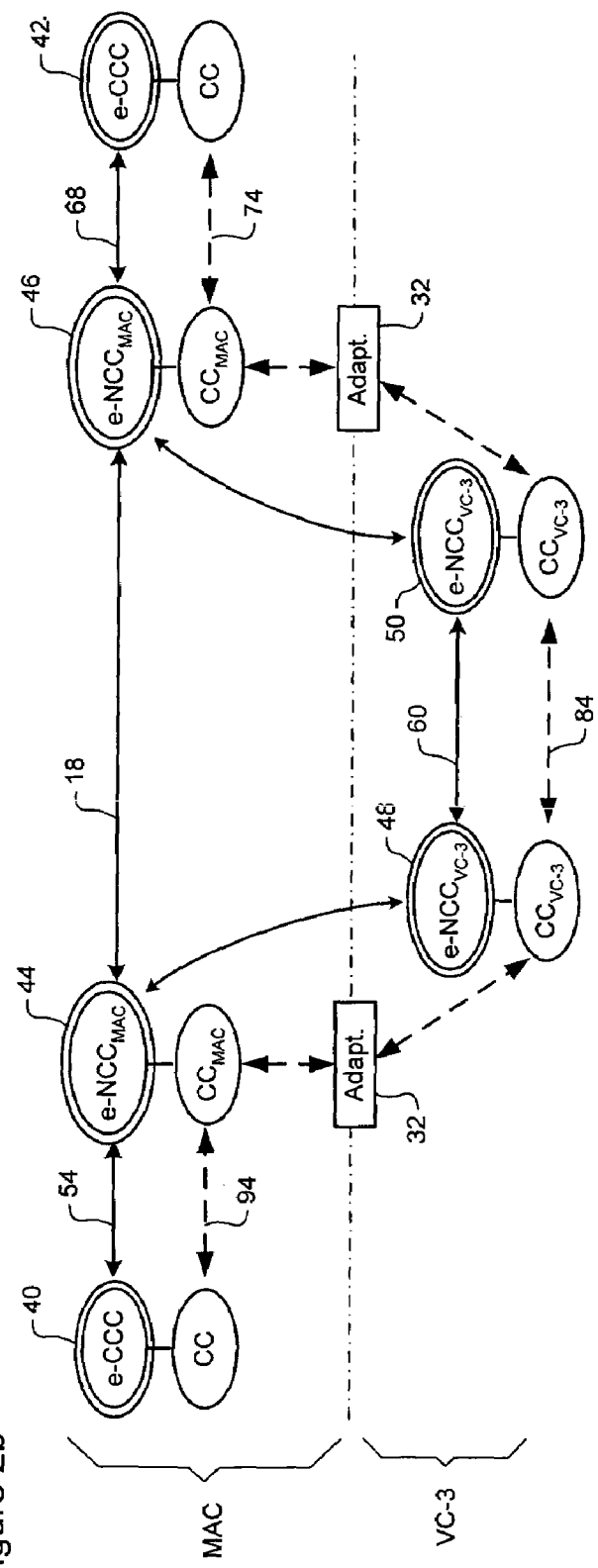
Figure 3:
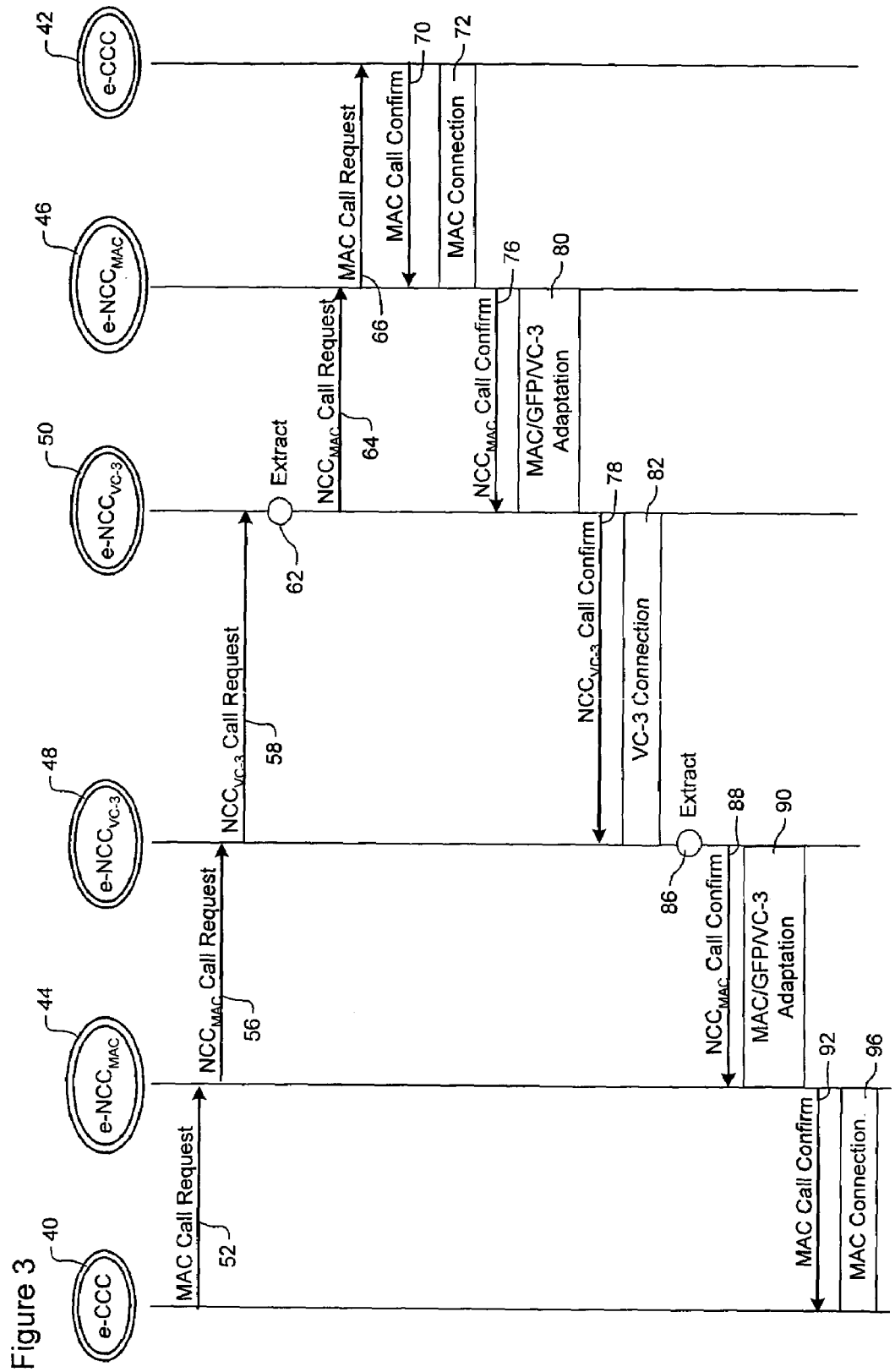
FIG. 3 schematically illustrates principal messaging in a process for setting up a multi-layer call in accordance with the method of the present invention.

FIGS. 2 and 3 continue the example of FIG. 1, by illustrating the set up of an Ethernet flow through a VC-3 transport network, in accordance with the present invention. FIGS. 2a and 2b show equipment and control-plane views, respectively, while FIG. 3 shows principle massage flows. Referring now to FIG. 2, the conventional calling/called party call controllers 6 and 38 of FIG. 1 are replaced by enhanced calling/called party call controllers 40 and 42. Similarly, the conventional network call controllers 12, 20, 28 and 30 of FIG. 1 are replaced by enhanced network call controllers 44, 46, 48 and 50. Thus, an originating client 2 has an enhanced Calling/called party Call Controller (e-CCC) 40 which places a call within the MAC layer. Thus, a call request 52 is formulated and sent into the network by the originating e-CCC 40. The call request 52 is received by a MAC-layer enhanced Network Call Controller (e-NCC$_{MAC}$) 44 within an ingress network element (NE-1) 14 of the VC-3 network 16. This enables a call segment 54 to be formed between the two call controllers 40, 44.

At the ingress NE 14, the ingress e-NCC$_{MAC}$ 44 determines that the Characteristic Information (CI) of the call cannot be supported within the MAC layer (since there is no MAC layer in the network at all). The ingress e-NCC$_{MAC}$ can also access a directory service (not shown) in a conventional manner to determine the SNPP for the destination address in the call request. In this case, the SNPP is a network element identifier where the destination e-NCC$_{MAC}$ 46 resides. The ingress e-NCC$_{MAC}$ then formulates an NCC$_{MAC}$ call request 56 (see FIG. 3) containing the SNPP and performance requirements (e.g., bit rate) of the MAC flow, and sends the NCC$_{MAC}$ call request 56 to an enhanced VC-3 layer NCC (e-NCC$_{VC-3}$) 48 within the ingress NE 14. This ingress e-NCC$_{VC-3}$ 48 has a scope similar to a Soft Permanent Connection (SPC) in that its corresponding egress e-NCC$_{VC-3}$ 50 (resident in the egress network element—NE-2 22) is within the network 16.

In response to the ingress NCC$_{MAC}$ call request 56, the ingress e-NCC$_{VC-3}$ 48 determines that the performance requirements of the MAC flow can be satisfied within the VC-3 layer using a Generic Framing Protocol (GFP) adaptation. Thus, the ingress e-NCC$_{VC-3}$ 48 formulates an NCC$_{VC-3}$ call request 58, which is sent to the egress e-NCC$_{VC-3}$ 50 in order to instantiate a server-layer call 60 at the VC-3 layer between the ingress e-NCC$_{VC-3}$ 48 and the egress e-NCC$_{VC-3}$ 50 resident in the destination Network element (NE-2) 22. The NCC$_{VC-3}$ call request 58 encapsulates the NCC$_{MAC}$ call request 56, which is opaque in the sense that it is conveyed through the VC-3 control plane without being extracted or examined at intermediate nodes. Transport of the NCC$_{VC-3}$ call request 58 can be accomplished using the conventional connection controller messaging protocol in the control plane. The conventional GFP adaptation to VC-3 payload is implemented between the MAC and VC-3 connection controllers within NE-1, in a conventional manner.

When the egress e-NCC$_{VC-3}$ 50 receives the NCC$_{VC-3}$ call request 58, it processes the VC-3 call in a conventional manner, and then extracts (at 62) the NCC$_{MAC}$ call request 56. This call request is passed to the MAC layer control plane which instantiates a call in the enhanced egress NCC$_{MAC}$ 46, and then passes the NCC$_{MAC}$ call request to it (at 64). In response to the NCC$_{MAC}$ call request, the egress e-NCC$_{MAC}$ 46 forwards the call request (at 66) to the destination e-CCC 42 in order to set up the MAC-layer call 68 between the egress e-NCC$_{MAC}$ 46 and the destination e-CCC 42. Additionally, a conventional GFP adaptation to VC-3 payload is implemented between the MAC and VC-3 connection controllers within NE-2, in a conventional manner.

The destination e-CCC 42 processes the call request, and sends a MAC call confirmation 70 back to the egress e-NCC$_{MAC}$ 46. When the egress e-NCC$_{MAC}$ receives the MAC call confirmation, the egress e-NCC$_{MAC}$ processes the call confirmation (at 72) to set up the MAC connection 74, and then passes the call confirmation to the egress e-NCC$_{VC-3}$ 50 (at 76). The egress e-NCC$_{VC-3}$ 50 places the MAC call confirmation into its own VC-3 call confirmation, which is sent (at 78) to the ingress e-NCC$_{VC-3}$ 48. The egress e-NCC$_{VC-3}$ 50 also processes the MAC call confirmation (at 80) to set up a GFP adaptation to VC-3 payload 32 between the MAC and VC-3 layer connection controllers. Upon receipt of the VC-3 call confirmation, the ingress e-NCC$_{VC-3}$ 48 processes the call confirmation (at 82) to set up the VC-3 connection 84 between the ingress and egress network elements 14, 22. The ingress e-NCC$_{VC-3}$ then extracts (at 86) the MAC call confirmation, and passes it back to the ingress e-NCC$_{MAC}$ 44 (at 88). A GFP adaptation to VC-3 payload 33 is also set up (at 90) between the MAC and VC-3 layer connection controllers in the ingress network element 14. The MAC call confirmation can then be forwarded (at 92) to the originating e-CCC 40 by the ingress e-NCC$_{MAC}$ 44, and the accompanying MAC connection 94 set up (at 96).

In accordance with the second view of the present invention, a management model contains objects that correspond to calls in a multi-layer network. Where a call in a client layer and a call in a server layer have an association in G.8080 control planes, the corresponding management objects for the calls also have an association. This enables call dependencies to be managed by network management applications. An interface such as TMF814 can be extended to reflect these call object relationships.

In this model, the association of calls also includes the case where multiple client calls are associated with a common call in a server layer. For example, two Ethernet calls from separate ingress links could be supported by a single VC-4 connection using Ethernet multiplexing over GFP The embodiment(s) of the invention described above is(are) intended to be exemplary only. The scope of the invention is therefore intended to be limited solely by the scope of the appended claims.

We claim:

1. A method of establishing a call across a multi-layer transport network, the method comprising steps of:
   instantiating a first call controller within a respective first layer of the network;
   determining whether a respective first connection for the call can be supported by the first layer;

if the connection can be supported by the first layer, setting up the call using connections in the first layer of the network; and otherwise:
- instantiating a second call controller in a respective second layer of the network; and
- defining an association between the first and second call controllers.

2. A method as claimed in claim 1, wherein the second layer is a server layer to the first layer.

3. A method as claimed in claim 1, wherein the step of setting up the call through the first layer of the network comprises a step of sending a call request message through a control link adapted to convey call requests for the first layer of the network.

4. A method as claimed in claim 3, further comprising steps of:
- receiving the call request message through the control link;
- determining whether the call request message contains an encapsulated call request message for a third layer of the network; and
- if an encapsulated call request message is found:
  - extracting the encapsulated call request message; and
  - passing the extracted call request message to the third layer.

5. A method as claimed in claim 4, wherein the third layer is a client layer to the first layer.

6. A method as claimed in claim 1, wherein the step of instantiating a second call controller in a respective server layer of the network comprises a step of passing a call request message to a control plane of the server layer, the control plane being responsive to the call request message to instantiate the second call controller.

7. A method as claimed in claim 6, wherein the call request message comprises at least information identifying the first call, and wherein the step of defining an association between the first and second call controllers comprises a step of passing the call request message to the second call controller.

8. A method of managing a call within a multi-layer transport network, the method comprising steps of:
- determining whether a connection for the call can be supported by a first layer of the network;
- if the connection can be supported by the first layer, setting up an association between a call management object of the call and a respective connection management object in the first layer; and otherwise:
- defining an association between the call management object and a second call management object instantiated within a respective second layer of the network.

9. A method as claimed in claim 8, wherein the second layer is a server layer to the first layer.

10. A method as claimed in claim 8, wherein the step of defining an association between the call management object and the second call management object comprises a step of passing a call request message to a control plane of the second layer, the call request message including at least information identifying the call management object.

11. A method as claimed in claim 8, wherein the step of setting up the connection through the first layer comprises a step of sending a call request message through a control link adapted to convey call requests for the first layer of the network.

12. A method as claimed in claim 11, further comprising steps of:
- receiving the call request message through the control link;
- determining whether the call request message contains an encapsulated call request message for a third layer of the network; and
- if an encapsulated call request message is found, defining an association between the call management object and a respective third call management object instantiated within the third layer of the network.

13. A method as claimed in claim 12, wherein the third layer is a client layer to the first layer.

14. A method as claimed in claim 12, wherein the step of defining an association between the call management object and the third call management object comprises steps of:
- extracting the encapsulated call request message; and
- passing the extracted call request message to a control plane of the third layer.

* * * * *